(12) United States Patent
Kotz et al.

(10) Patent No.: US 7,802,470 B2
(45) Date of Patent: Sep. 28, 2010

(54) ULTRASONIC LIQUID LEVEL DETECTOR

(75) Inventors: Dennis M. Kotz, North Augusta, SC (US); William R. Hinz, Augusta, GA (US)

(73) Assignee: Savannah River Nuclear Solutions LLC, Aiken, SC (US)

( * ) Notice: Subject to any disclaimer, the term of this patent is extended or adjusted under 35 U.S.C. 154(b) by 282 days.

(21) Appl. No.: 12/009,993

(22) Filed: Jan. 23, 2008

(65) Prior Publication Data
US 2009/0183564 A1  Jul. 23, 2009

(51) Int. Cl.
G01F 23/28  (2006.01)
(52) U.S. Cl. .................................................. 73/290 V
(58) Field of Classification Search ............... 73/290 V; 340/621
See application file for complete search history.

(56) References Cited

U.S. PATENT DOCUMENTS

| | | | |
|---|---|---|---|
| 2,960,678 A | 11/1960 | Beard et al. | |
| 3,357,246 A * | 12/1967 | Stearn et al. ............. | 73/290 R |
| 3,407,398 A * | 10/1968 | Stearn ......................... | 340/512 |
| 3,825,025 A | 7/1974 | Samuel et al. | |
| 4,144,517 A | 3/1979 | Baumoel | |
| 4,145,917 A | 3/1979 | Brazhnikov et al. | |
| 4,228,530 A | 10/1980 | Bergey | |
| 4,299,114 A | 11/1981 | Silvermetz et al. | |
| 5,121,340 A * | 6/1992 | Campbell et al. ............. | 702/54 |
| 5,195,058 A | 3/1993 | Simon | |
| 5,269,188 A | 12/1993 | Esin et al. | |
| 5,428,984 A | 7/1995 | Jones et al. | |
| 5,437,178 A | 8/1995 | Esin et al. | |
| 5,438,868 A | 8/1995 | Holden et al. | |
| 5,440,929 A * | 8/1995 | Huang et al. ................... | 73/628 |
| 5,452,611 A | 9/1995 | Jones et al. | |
| 5,586,085 A | 12/1996 | Lichte | |
| 5,644,299 A | 7/1997 | Cruickshank | |
| 5,663,503 A | 9/1997 | Dam et al. | |
| 5,735,166 A | 4/1998 | Dam | |
| 5,808,200 A | 9/1998 | Dam | |
| 6,412,344 B1 * | 7/2002 | Danicich et al. ........... | 73/290 V |
| 6,832,516 B1 | 12/2004 | Dam et al. | |
| 6,925,870 B2 | 8/2005 | Pappas et al. | |
| 7,117,738 B2 | 10/2006 | Miyagawa et al. | |
| 7,168,314 B2 | 1/2007 | Voss | |
| 7,204,142 B2 | 4/2007 | Miyagawa et al. | |
| 2010/0005878 A1 * | 1/2010 | Dockendorff et al. ..... | 73/290 V |

* cited by examiner

*Primary Examiner*—Hezron Williams
*Assistant Examiner*—Nathaniel Kolb
(74) *Attorney, Agent, or Firm*—J. Bennett Mullinax, LLC

(57) ABSTRACT

An ultrasonic liquid level detector for use within a shielded container, the detector being tubular in shape with a chamber at its lower end into which liquid from in the container may enter and exit, the chamber having an ultrasonic transmitter and receiver in its top wall and a reflector plate or target as its bottom wall whereby when liquid fills the chamber a complete medium is then present through which an ultrasonic wave may be transmitted and reflected from the target thus signaling that the liquid is at chamber level.

9 Claims, 4 Drawing Sheets

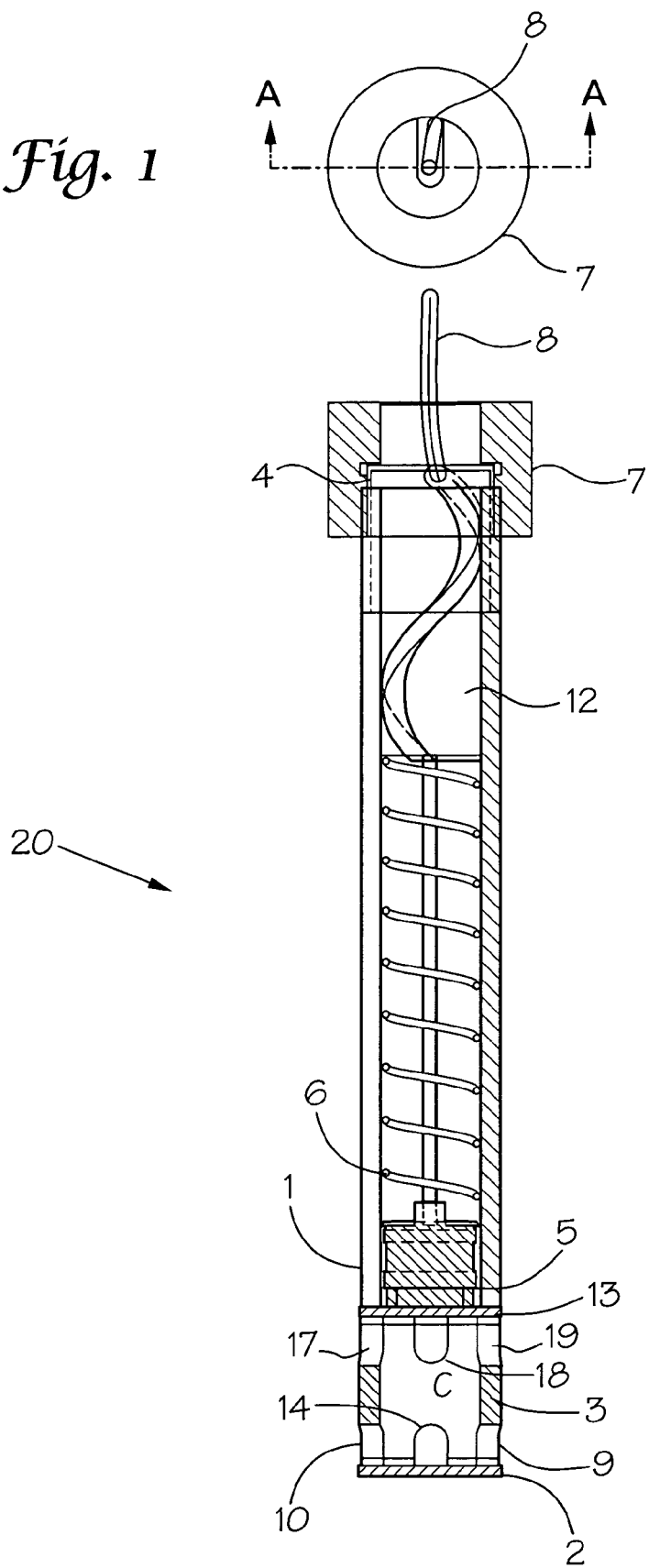

ULTRASONIC LIQUID LEVEL DETECTOR

FEDERALLY SPONSORED RESEARCH

The U.S. Government has rights in this invention pursuant to contract number DE-ACO9-96SR18500 between the U.S. Department of Energy and Washington Savannah River Company LLC.

FIELD OF THE INVENTION

This invention relates to a liquid level detector employing an ultrasonic transducer that may be located within the container of the liquid whose level is being measured. More specifically, the ultrasonic detector includes its own target or reflector.

BACKGROUND OF THE INVENTION

Ultrasonic devices have been used to determine the level of liquid inside of a container; and one common practice is to measure from the side or bottom of the container with the ultrasonic transducer attached to the exterior surface of the container. If the transducer is above the liquid level, no return signal is generated as the high frequency used readily travels through liquids and solids but not through air or gas. Installation of the ultrasonic transducer on the side of a container is not always convenient because of space limitations due to the necessity of shielding of radioactive material, or overpacks used with toxic liquids, or the presence of insulation. Accordingly, it is one object of the present invention to provide an ultrasonic detector which can be used inside of a container.

One prior art device for measuring liquid level within a container by ultrasonic means is described in U.S. Pat. No. 2,960,678 which issued on Nov. 15, 1960 to R. B. Beard, et al. In this device, a transmitter and a receiver are located in the top of a container spaced apart from each other above the surface of a liquid in the container. An ultrasonic wave from the transmitter is reflected off the surface of the liquid within the container and is measured for its attenuation by the receiver, the attenuation being proportional to the level of the liquid within the container. However, this device requires separate receivers and transmitters and relies upon the accuracy of the attenuation measurement. Accordingly, it is one object of the present invention to provide a simple, compact detector that can be positioned within a container and that is not dependent upon container geometry.

Another possible arrangement would be to position an ultrasonic transducer within a container such as a drum and when the level of the liquid reaches the transducer, the ultrasonic wave path would be completed through the liquid but if the bottom of the drum or container were not uniform, the reflection of the wave may vary in its direction and intensity and thus, not provide a reliable return signal. Accordingly, it is another object of the present invention to provide a liquid level detector which may be positioned above a liquid without being dependent upon the orientation of the detector or the distance from the liquid surface to the bottom of the container.

These and other objects are accomplished by the invention which is described below:

SUMMARY OF THE INVENTION

The novel and unique liquid level detector of the present invention, in one aspect, comprises: (1) a housing which can be mounted above and spaced apart from the upper level of a body of liquid; (2) an ultrasonic transducer for generating high-frequency sound waves and receiving the echo of said generated sound waves; said frequency being selected so that waves generated at the selected frequency will not travel through air, but will readily propagate through liquids, said transducer being carried by said housing; and (3) a reflector plate or target spaced apart from said transducer so that when the level of the liquid of said body of liquid rises the liquid will fill the space between the transducer and the reflector plate; whereby when liquid fills the space between the transducer and the reflector plate, a wave generated by the transducer will reflect back from the reflector and be detected indicating that liquid is at the level of the transducer. However, before liquid fills the chamber, the transducer can transmit wave energy through the closure plate and receive a signal back. The reflective pattern and the spacing of the receiver signals function as check of the transducer and its coupling adequacy as a self test feature.

In a preferred embodiment, the housing is cylindrically shaped and is mounted with its longitudinal axis being vertical so that the cylinder has upper and lower ends. The reflector plate or target is positioned at the lower end of the cylinder. Preferably, the transducer is located in the lower end of the cylinder above and spaced apart from the reflector plate, the space between the plate and the transducer defining a chamber, said cylinder having openings so the chamber will completely fill with liquid and will drain as the level of said body of liquid rises and falls. The invention is also a method of using the detector to indicate the level of a liquid by placing the detector at a predetermined location.

Once installed in a container where the liquid level is to be determined, if left in place in contact with the liquid, long term, the reflected pattern can be used to measure wall thinning and, hence, monitor corrosion rates where the closure plate is fabricated of the same material as the container. Accordingly, the invention can serve as a corrosion monitor. Also, changes in the velocity of the reflected signal through the liquid to and from the target which is at a known spacing can indicate changes within the liquid.

DESCRIPTION OF THE DRAWINGS

The accompanying drawings are part of the disclosure of this invention and are presented by way of illustration and not by way of limitation. In the drawings:

FIG. 1 is a top plan view of a preferred embodiment of the ultrasonic liquid level detector of the present invention;

FIG. 2 is an elevation view in section along lines A-A of FIG. 1;

DETAILED DESCRIPTION

Figure 3:
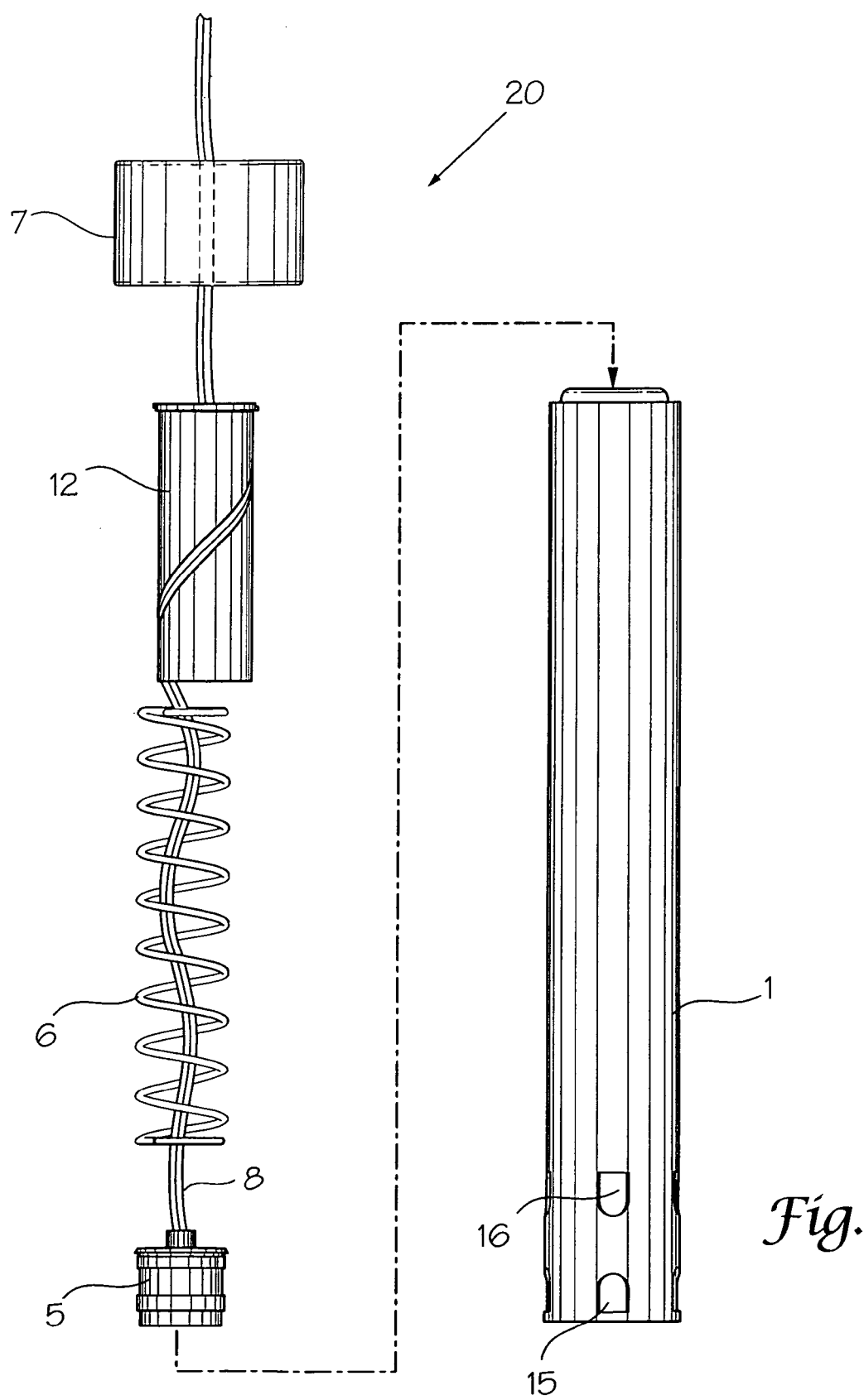
FIG. 3 shows a preferred embodiment of the invention in partial disassembly displaying the constituent parts thereof.

Looking first at FIGS. 1 and 2, FIG. 2 is a vertical section or sectional elevation along the lines A-A of FIG. 1, FIG. 1 being the top plan view of one preferred embodiment of the present invention. In FIG. 2, indicator or probe 20 is shown which comprises the indicator housing 1 which is in the shape of a cylinder or stainless steel tube with sensor or transducer 5 positioned therein at the lower end of the cylinder and is held in place against a sealed closure plate 13 by spring 6 and is connected to a power source and monitors by means of cable 8. The monitor and power sources are not shown and appropriate components readily obtained by those skilled in the art.

Below the cylinder 1, chamber C is formed which preferably is an extension of tube or cylinder 1 with wall 3 having openings 9, 10, 14, 15, 16, 17, 18 and 19 therein to permit the free flow of liquid into and out of the chamber space. See also FIG. 3. The lower holes 9, 10, 14 and 15 are fill holes and the upper holes 16, 17, 18 and 19 are vent holes. Reflector plate 2 encloses the bottom of chamber C and is also a target plate which receives ultrasonic waves transmitted from transducer 5 when chamber C is filled with a liquid. Cap 7 covers insert 4 to close the upper end of the cylinder or housing 1 and closure plate 13 closes the cylinder below transducer 5. The emitted wave travels through closure plate 13.

In FIG. 3, a preferred embodiment and best mode of the invention is shown in disassembled form with tube or cylinder 1 having the openings 15 and 16 on the lower end of the tube. Sensor or transducer 5 is shown connected to electrical cable 8 which travels through the positioning spring 6. The best mode transducer has been found to be Benchmark Composite Series MSW-QC, 5 Mhz, 0.500" diameter contact transducer P/N 113-244-591 available from GE Inspection Technologies, although alternative types, sizes and frequencies may be better suited for other applications. The upper shielding plug 12 is shown along with the cap 7 and cable 8 to the transducer 5.

Figure 4:
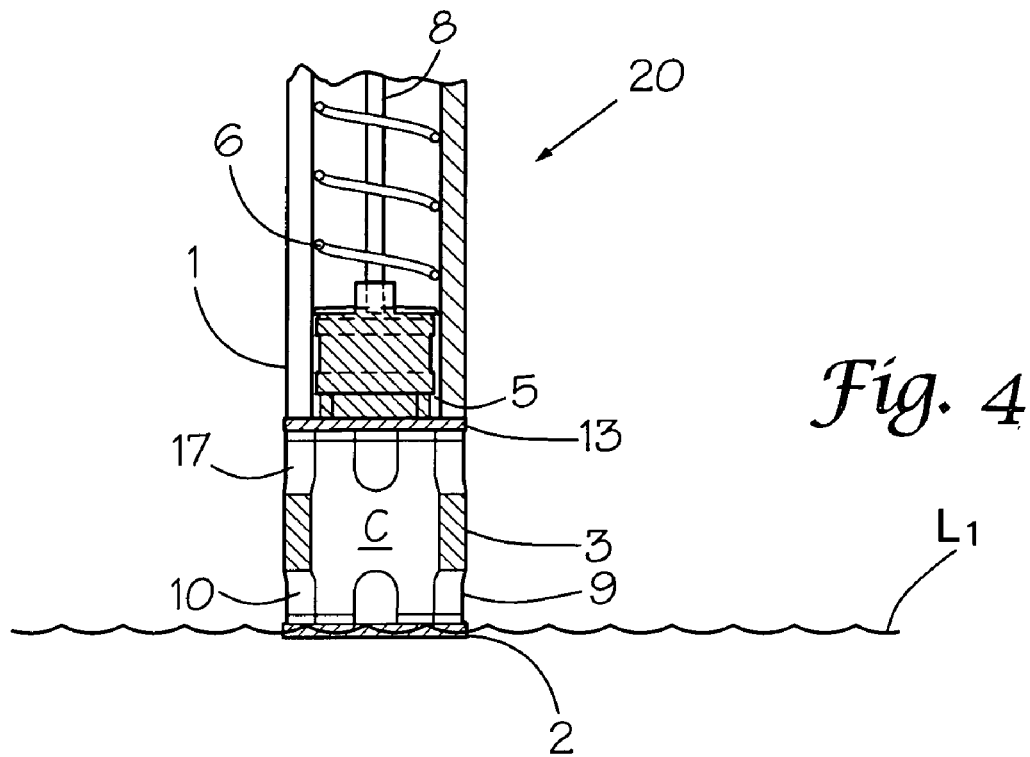
FIG. 4 shows the liquid level detector in partial section position above a liquid whose level is to be detected in showing the chamber of the detector being empty.
Figure 5:
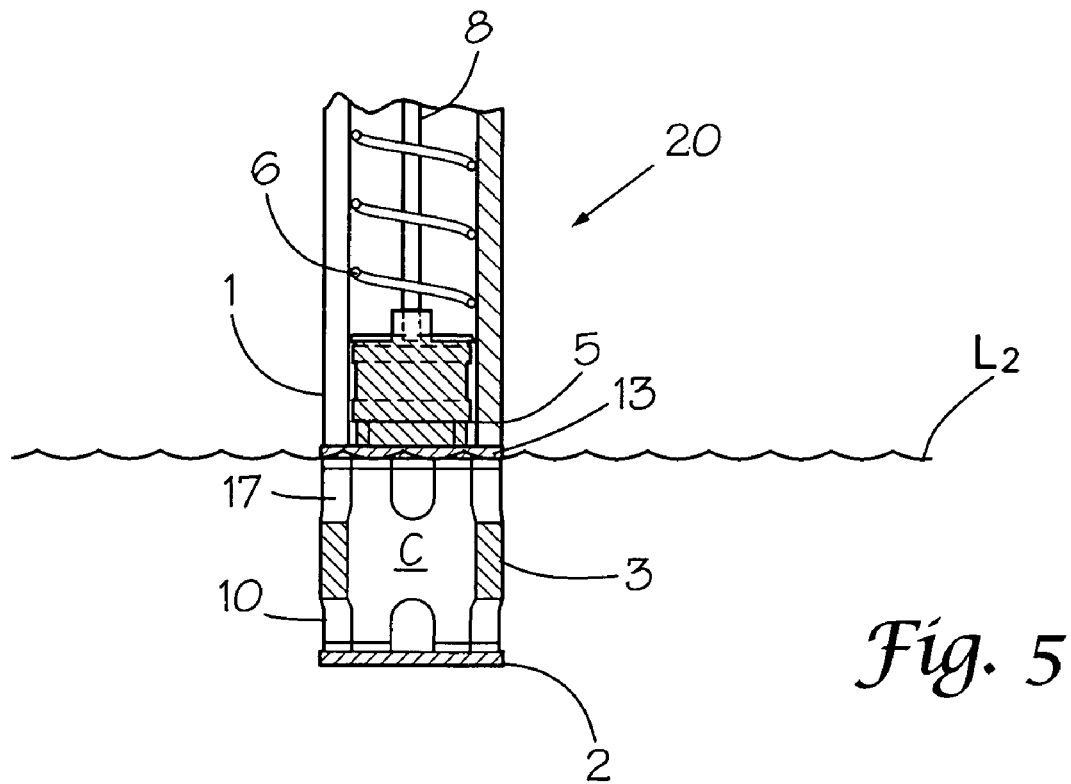
FIG. 5 is the view of FIG. 4 but with the chamber filled with liquid.

Turning to FIGS. 4 and 5, the function of the detector of the present invention can be more fully appreciated. In FIG. 4, the probe 20 is positioned with its lower end forming chamber C and the target plate 2 barely in contact with the liquid at level $L_1$. At this level no liquid has entered chamber C and the ultrasonic waves produced by transducer 5 pass through plate 13 and are reflected back at the air interface on the far side of plate 13. In FIG. 5, the liquid level has risen to a level $L_2$ and the chamber C is filled with liquid so that when an ultrasonic wave is emitted from the transducer 5 it will travel within the liquid in the chamber C to the reflector plate 2 and is echoed or reflected back to the sensor with a strong echo and short time lapse. When the strong echo or reflected wave is received by the sensor a signal is transmitted to a monitor by cable 8. It is then known that the level of the liquid has reached the top of the chamber so that the level of the liquid is positively established.

Figure 6:
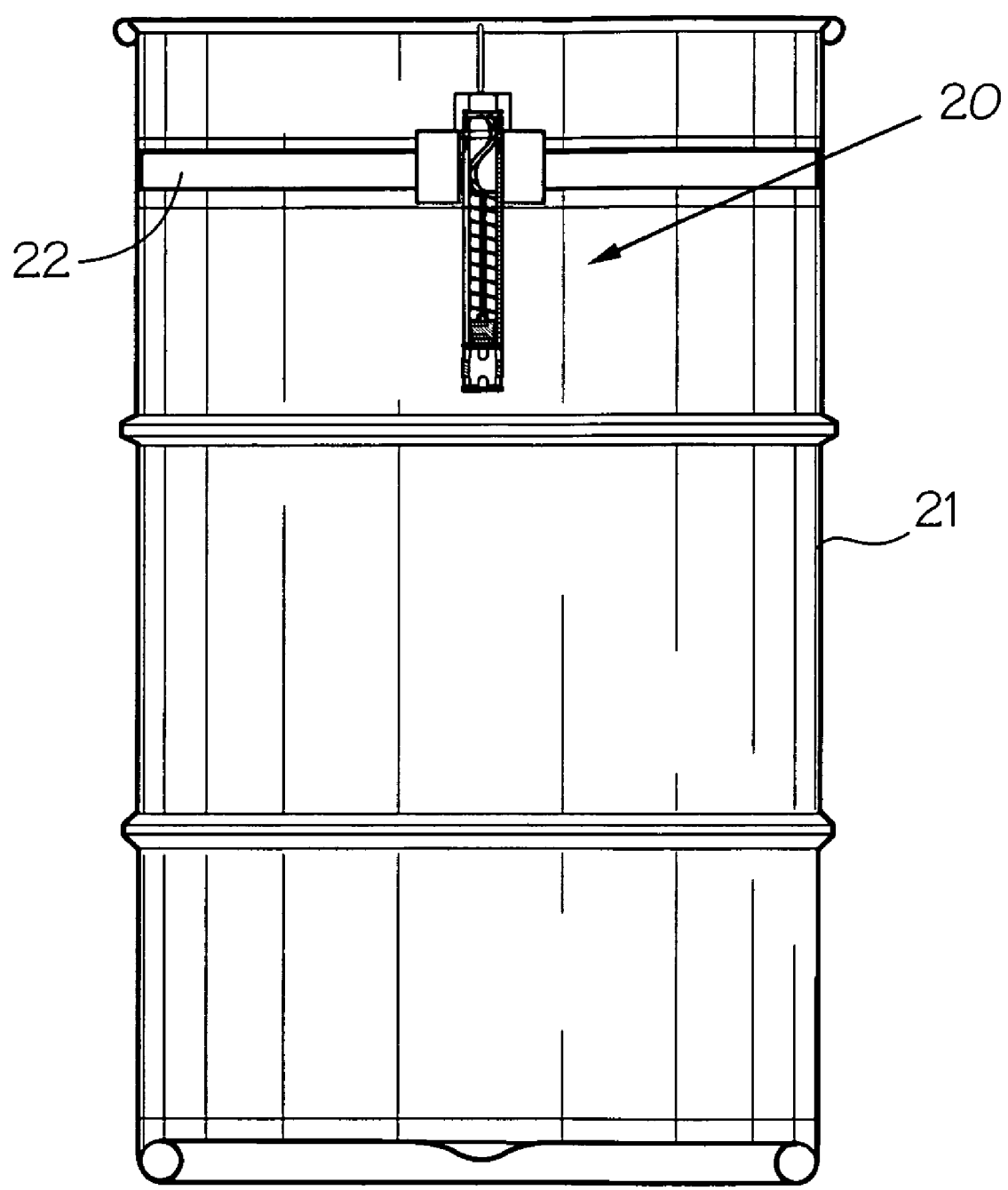
FIG. 6 shows an elevation section view of a drum for containing liquid with a preferred embodiment of the liquid level detector of the present invention positioned therein.

In FIG. 6, a typical drum 21 is shown with mounting means or support band 22 which carries the probe or indicator 20. This arrangement is especially useful when a container is being filled remotely with a hazardous liquid such as a radioactive liquid or one that is highly toxic and shielding is positioned around the container so that access from the side or bottom is not possible. Thus, the filling operation can be carried out knowing that when the desired fill level is reached, the filling operation can be halted without fear of over-filling and the drums can be sealed. All this of course is done remotely.

While, in accordance with the provisions of the statutes and the decisions there has been illustrated and described herein the best mode of the invention which is presently known, it will be appreciated by those skilled in the art that changes may be made in the form of the invention as disclosed without departing from the spirit of the invention as set forth in the claims below which are the only limit on the scope of the invention.

What is claimed is:

1. An ultrasonic liquid level detector comprising:
  a) a housing which is mounted above and spaced apart from the upper level of a body of liquid, the housing having upper and lower ends, wherein the housing is a cylinder having a hollow interior, wherein the housing is located inside of a drum that holds the liquid, wherein a longitudinally extending wall of the housing forms a portion of an exterior surface of the housing and a portion of an interior surface of the housing, wherein the housing has a closure plate located on one end thereof that defines a portion of the hollow interior;
  b) a reflector plate as a target positioned at the lower end of said housing so that when the level of the liquid of said body of liquid rises, the liquid will fill the space between the closure plate of the housing and the reflector plate;
  c) an ultrasonic transducer for generating high frequency sound waves and for receiving the echo of said generated waves, said frequency being selected so that waves generated at the selected frequency will reflect from the reflector plate in a liquid, said transducer being carried by said housing and being spaced apart from and above said reflector plate whereby when liquid fills the space between the transducer and the reflector plate, a wave generated by the transducer will reflect back from the reflector plate indicating that liquid is at the level of the transducer, wherein the transducer is located in the hollow interior of the housing; and
  d) a spring located in the hollow interior that contacts the longitudinally extending wall of the housing that forms a portion of the interior surface of the housing along the entire longitudinal length of the spring, wherein the spring urges the transducer towards the reflector plate and wherein a distal end of the transducer contacts the closure plate.

2. The liquid level detector of claim 1 wherein said housing is mounted with the longitudinal axis of the cylinder being vertical.

3. The liquid level detector of claim 2 wherein said transducer is located adjacent the lower end and within said cylinder.

4. The liquid level detector of claim 3 wherein said reflector plate is suspended from the lower end of said cylinder, the space between the plate and the transducer defining a chamber which can be fully filled with liquid and drained as the level of said body of liquid rises and falls.

5. The liquid level detector of claim 4 wherein the housing comprises stainless steel.

6. The liquid level detector of claim 1, wherein the closure plate prevents the transducer from being contacted by the liquid.

7. A method of detecting the level of a liquid comprising the steps of:
  a) providing a liquid level detector comprising a housing with an ultrasonic wave transmitting transducer and target positioned within one end thereof for reflecting waves transmitted by said transducer, said target and transducer being spaced apart, the space between the transducer and target defining a chamber, said chamber having openings to allow liquid to flow into and out of said chamber, the reflection of waves from said target being detectable by said transducer when said chamber is filled with liquid, wherein a spring is carried by said housing and urges said transducer towards said target, wherein the housing is located inside of a drum that holds the liquid, wherein a longitudinally extending wall of the housing forms a portion of an exterior surface of the housing and a portion of an interior surface of the housing, wherein the housing has a closure plate that defines a portion of a hollow interior of the housing and a portion of the chamber, wherein the spring is located in the hollow interior and contacts the longitudinally extending wall of the housing that forms a portion of the interior surface of the housing along the entire longitudinal length of the spring, wherein a distal end of the transducer contacts the closure plate; and b) placing said detector above a liquid whose level is to be detected, the position of said detector being at a predetermined position; whereby when said level rises the chamber will fill and the transducer will detect waves it transmits that are reflected from said target.

8. The method of claim 7 including the step of maintaining a level of liquid that fills the chamber allowing periodic monitoring for changes in the reflection pattern of said waves to provide a corrosion rate of the housing material.

9. The method of claim 7 wherein in the monitoring step the wave reflection speeds are monitored to indicate changes in the composition of the liquid.

* * * * *